(12) United States Patent
Gopinath et al.

(10) Patent No.: US 9,195,972 B2
(45) Date of Patent: Nov. 24, 2015

(54) SMART CALENDAR

(71) Applicant: International Business Machines Corporation, Armonk, NY (US)

(72) Inventors: Divya Gopinath, Clarksburg, MD (US); Rajesh Radhakrishnan, Reston, VA (US); Jennifer A. Watson, Wasaga Beach, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 257 days.

(21) Appl. No.: 14/040,784

(22) Filed: Sep. 30, 2013

(65) Prior Publication Data

US 2015/0095086 A1 Apr. 2, 2015

(51) Int. Cl.
*G06Q 10/10* (2012.01)

(52) U.S. Cl.
CPC .................................. *G06Q 10/1093* (2013.01)

(58) Field of Classification Search
CPC ....................................................... G06Q 10/10
USPC ......................................................... 715/751
See application file for complete search history.

(56) References Cited

U.S. PATENT DOCUMENTS

| | | | | |
|---|---|---|---|---|
| 6,820,096 | B1* | 11/2004 | Kanevsky et al. | 1/1 |
| 7,184,965 | B2* | 2/2007 | Fox et al. | 705/7.29 |
| 7,487,234 | B2* | 2/2009 | Doss et al. | 709/223 |
| 8,315,909 | B1* | 11/2012 | Barker | 705/16 |
| 8,375,034 | B2* | 2/2013 | Norton et al. | 707/748 |
| 8,442,758 | B1* | 5/2013 | Rovik et al. | 701/424 |
| 2002/0091692 | A1* | 7/2002 | Yoshida et al. | 707/9 |
| 2002/0133821 | A1* | 9/2002 | Shteyn | 725/46 |
| 2005/0050061 | A1* | 3/2005 | Karstens | 707/100 |
| 2005/0065832 | A1* | 3/2005 | Virta | 705/8 |

(Continued)

FOREIGN PATENT DOCUMENTS

| | | |
|---|---|---|
| EP | 0954814 B1 | 5/2006 |
| EP | 2040209 A1 | 3/2009 |

OTHER PUBLICATIONS

Refanidis, "On Scheduling Events and Tasks by an Intelligent Calendar Assistant", Workshop on Constraint Satisfaction Techniques for Planning and Scheduling Problems, COPLAS 2009, 10 pgs.

(Continued)

*Primary Examiner* — Reza Nabi
(74) *Attorney, Agent, or Firm* — Catherine Ivers; Hoffman Warnick LLC (57) ABSTRACT

A smart calendar system, method and program product that integrates disparate sets of data to identify scheduling conflicts and generate scheduling suggestions. The smart calendar system includes the following: a database for storing activity data associated with a user, wherein the activity data includes items scheduled for the user; an interface for receiving and storing profile data associated with the user; an analysis engine that includes: a system for selecting and interfacing with a plurality of external knowledge databases to obtain knowledge data associated with the user; a system that integrates the profile data, activity data, and knowledge data into a collection of integrated scheduling information; a suggestion system that suggests modifications to the items scheduled for the user, based on the integrated scheduling information; and a conflict system that identifies potential conflicts in the items scheduled for the user, based on the integrated scheduling information.

11 Claims, 3 Drawing Sheets

(56) References Cited

U.S. PATENT DOCUMENTS

| | | | |
|---|---|---|---|
| 2007/0010942 A1* | 1/2007 | Bill | 701/209 |
| 2009/0006994 A1* | 1/2009 | Forstall et al. | 715/764 |
| 2009/0089133 A1* | 4/2009 | Johnson et al. | 705/9 |
| 2009/0158173 A1* | 6/2009 | Palahnuk et al. | 715/753 |
| 2009/0259674 A1* | 10/2009 | Griffin et al. | 707/101 |
| 2010/0312838 A1* | 12/2010 | Lyon et al. | 709/206 |
| 2011/0130958 A1* | 6/2011 | Stahl et al. | 701/201 |
| 2012/0271676 A1* | 10/2012 | Aravamudan et al. | 705/7.18 |
| 2012/0284637 A1* | 11/2012 | Boyer et al. | 715/751 |
| 2013/0108179 A1* | 5/2013 | Marchesotti et al. | 382/224 |
| 2014/0149771 A1* | 5/2014 | Krishna et al. | 713/323 |
| 2015/0095086 A1* | 4/2015 | Gopinath et al. | 705/7.18 |
| 2015/0128057 A1* | 5/2015 | O'Sullivan et al. | 715/738 |

OTHER PUBLICATIONS

O'Grady, "iOS app helps parents predict kid's clothing sizes", The Apple Core, Jan. 10, 2013, 4 pages.

Rose, "Smart calendar app Tempo speeds up your day", TUAW—The Unoffical Apple Weblog, Feb. 13, 2013, 7 pages.

ZoneWalker LLC, "aCar—Car Management, Mileage", Android Apps on Google Play, Jul. 10, 2013, 5 pages.

* cited by examiner

SMART CALENDAR

BACKGROUND

1. Field of the Invention

The present invention relates to personal calendaring software, and more particularly to a smart calendar system and method that integrates disparate sets of data to identify scheduling conflicts and generate scheduling suggestions.

2. Description of the Related Art

Personal electronic calendars are widely employed to assist users in managing their personal and business related activities. Unfortunately, current mainstream calendar applications lack a component of intelligence around personalization. For example, most users exhibit certain specific behaviors, habits and needs that have a potential impact on scheduling. For instance, travel time between appointments may depend upon where the user lives and works. Further, users may have specific medical needs that impact their ability to participate in certain types of scheduled events. Such personal aspects associated with the user are however not leveraged by current calendaring software.

SUMMARY

Disclosed is a smart calendar system, method and program product that integrates and leverages disparate sets of data to identify scheduling conflicts and generate scheduling suggestions. According to one aspect of the present invention, a computer system is disclosed having a smart calendar system for managing schedule items, comprising: a database for storing activity data associated with a user, wherein the activity data includes items scheduled for the user; an interface for receiving and storing profile data associated with the user, wherein the profile data includes metadata associated with potentially scheduled items; an analysis engine that includes: a system for selecting and interfacing with a plurality of external knowledge databases to obtain knowledge data associated with the user; a system that integrates the profile data, activity data, and knowledge data into a collection of integrated scheduling information; a suggestion system that suggests modifications to the items scheduled for the user, based on the integrated scheduling information; and a conflict system that identifies potential conflicts in the items scheduled for the user, based on the integrated scheduling information.

In a second aspect, a program product stored on a computer readable storage medium is disclosed, which when executed by a computer system, provides a smart calendar system for managing schedule items, and comprises: program code for storing activity data associated with a user, wherein the activity data includes items scheduled for the user; program code for receiving and storing profile data associated with the user, wherein the profile data includes metadata associated with potentially scheduled items; program code for selecting and interfacing with a plurality of external knowledge databases to obtain knowledge data associated with the user; program code that integrates the profile data, activity data, and knowledge data into a collection of integrated scheduling information; program code that suggests modifications to the items scheduled for the user, based on the integrated scheduling information; and program code that identifies potential conflicts in the items scheduled for the user, based on the integrated scheduling information.

In a third aspect, a computerized method for managing schedule items in an electronic calendar system is disclosed, comprising: storing activity data associated with a user, wherein the activity data includes items scheduled for the user; receiving and storing profile data associated with the user, wherein the profile data includes metadata associated with potentially scheduled items; selecting and interfacing with a plurality of external knowledge databases to obtain knowledge data associated with the user; integrating the profile data, activity data, and knowledge data into a collection of integrated scheduling information; and outputting at least one of a suggested modification to at least one of the items scheduled for the user and to a potential conflict in the items scheduled for the user, based on the integrated scheduling information.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

Described herein is an intelligent and personalized, i.e., "smart" calendar system. The smart calendar system allows the user to submit an assortment of personalized information and utilize a variety of external knowledge databases that are associated with the user. Data extracted from the knowledge databases, as well ongoing activity data collected for the user (both historical and real-time), allows an analysis engine to predict future events, identify conflicts, and automatically reschedule events or prompt the user with other suggested changes or suggested activities to perform.

Figure 1:
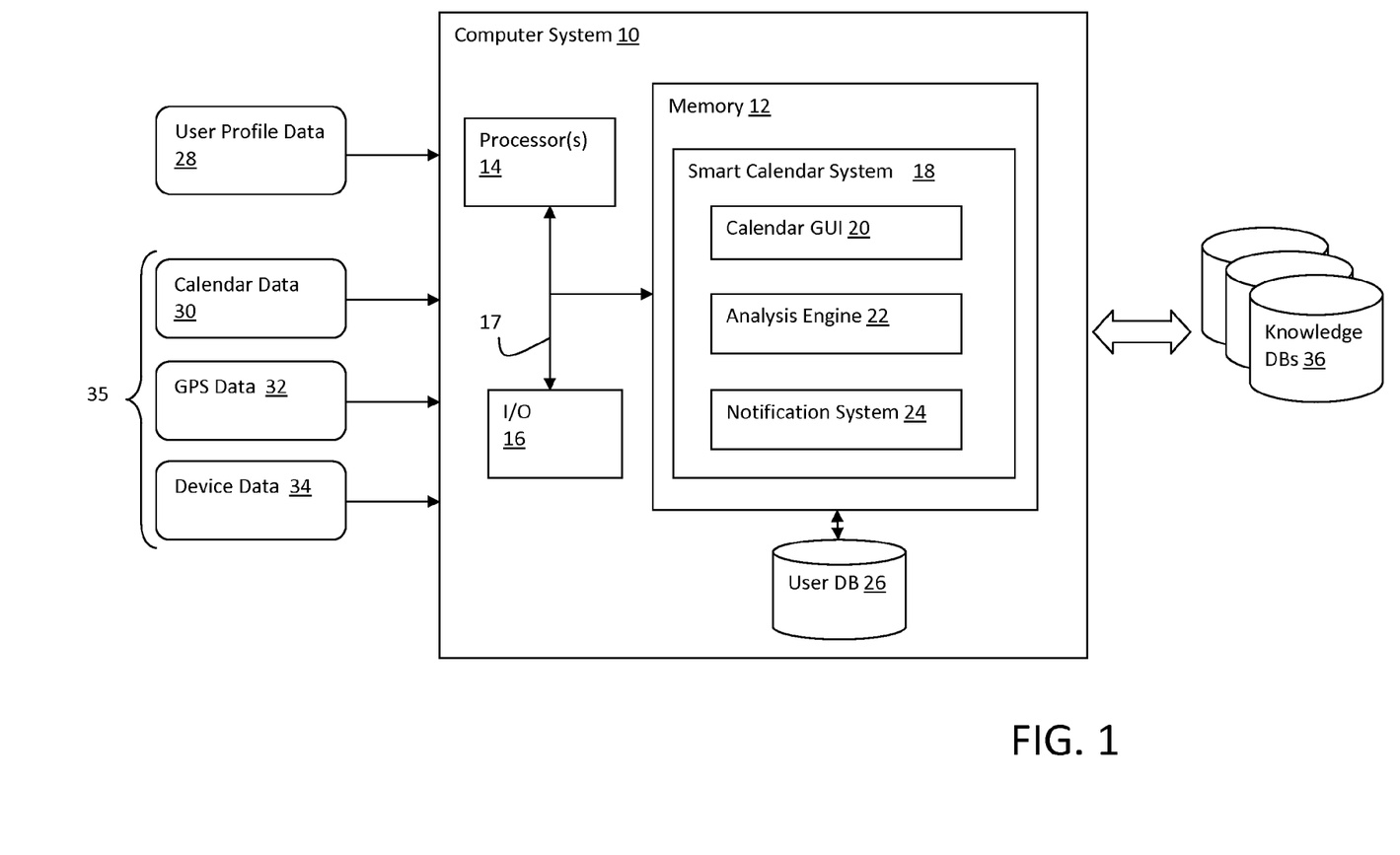
FIG. 1 depicts a computer system having a smart calendar system in accordance with embodiments of the present invention.

FIG. 1 depicts a computer system 10 having a smart calendar system 18. Smart calendar system 18 includes a calendar graphical user interface (GUI) 20, or an interface to an external calendar GUI such as Google Calendar™ or Microsoft Outlook® (which are common law and registered trademarks of Google Inc. and Microsoft Corporation, respectively), which allows a user to enter and manipulate items in an electronic calendar such as appointments, meetings, out of office notices, etc., i.e., calendar data 30. Smart calendar system 18 further includes an analysis engine 22 that analyzes and integrates various sets of data to identify potential conflicts and/or to generate calendar suggestions. Notification system 24 is used to notify the user of a potential conflict or suggestion using any means, e.g., via an email, SMS (short message service), highlighted entry in the calendar GUI 20, voice command, etc.

There are at least three types of data used by smart calendar system 18 to perform the described services, including user profile data 28, user activity data 35, and external knowledge database data 36.

The first type of data, user profile data 28 may comprise any set of information inputted by and about the user that potentially covers as many facets of the user as desired, including personal information, family information, medical information, property and devices owned by the user, household information, etc. The information, although generally static in nature, may be updated over time, e.g., with user inputs, based on life events, newly purchased items, service providers employed by the user, etc. Examples of user profile data 28 may include, for instance, information about: family members, including ages, health related issues, etc.; pets, including type, ages, health related issues, etc.; ownership and purchase history of property, including cars, homes, electronics, furniture, etc.; service providers used including family medical contact information (location/email/phone etc.); hair dresser information (location/email/phone etc.); automobile mechanic information location/email/phone etc.); identification data, such as telephone numbers, email addresses, global positioning system (GPS) identifiers such as a link to a smartphone or car GPS; etc.

In addition, user profile data 28 may include special details; referred to herein as "scheduling metadata" that could impact or affect an outcome of a scheduled event or that may affect other scheduled events/appointments. For example, if it is known that a child requires twenty-four hours to recover from a doctor's visit, or the user prefers to sleep in after a late night of travel, this scheduling metadata can be entered as user profile data 28 and later integrated with entered calendar items or classes of calendar items. Other types of scheduling metadata can be inferred, e.g., with a rules-based software program. For example, the address of a car mechanic might infer a certain amount of extra travel time required to service the user's car. Profile data may also allow the user to set up categories or classes of calendar items, such as personal, office related, medical, etc., which can later be utilized to prioritize items and better determine which events might conflict with others. For example an immunization appointment might not conflict with a scheduled business meeting but may conflict with a scheduled birthday party.

In addition, the user can configure the user profile data 28 to determine how to be notified by the notification system 24. For example, the user might want to receive a highlighted notification on the calendar one week prior to the actual event occurring in order to confirm or schedule appointments. Alternatively, the user may request email notifications or SMS notifications, or some combination thereof.

The second type of data used by smart calendar system 18 comprises user activity data 35, which generally comprises ongoing user-generated data. User activity data 35 may comprise any type of data that is regularly changing based on actions, activities, behaviors, etc., associated with the user or devices associated with the user. In the example shown in FIG. 1, user activity data 35 includes: (1) calendar data 30, including, e.g., items the user enters into the calendar such as meetings, appointments, travel, etc.; (2) Global Positioning System (GPS) data 32, including, e.g., location data streamed from the user's smart phone, automobile GPS system, or other GPS enabled system; and (3) device data 34, including, e.g., information streamed over the internet from smart appliances owned by the user, from a household alarm system, from the user's automobile, from the user's cell phone, etc.

Thus, user activity data 35 provides historical and real-time information that characterizes schedules, actions, behaviors, patterns, trends, etc., of the user or devices controlled by the user. For example, GPS data 32 may include a time-based historical record of the user's travel and location information, which may for instance reveal that the user is at a child's school every Saturday afternoon or at the hair dresser every other week on Thursday, etc. Device data 34 may comprise real-time and historical data about devices associated with the user. For instance, data streamed from the user's car may reveal that the car has its oil change at six month intervals, or that data collected from the user's smart phone indicates that the user tends to talk on their cell phone at specific times of each day. It is understood that the amount and types of user activity data 35 collected is unlimited, and that the examples described herein are for illustrative purposes only.

User activity data 35 may be streamed in or otherwise collected and stored in the user database 26, along with the user profile data 28.

The third type of data utilized by the smart calendar system 18 comprises knowledge data obtained from third party or external knowledge databases 36. Knowledge databases 36 may comprise category or industry specific information available for any class of data associated with the user. Knowledge databases 36 can be identified and/or selected in any manner for the user. For example, they can be directly selected by the user, selected based on some automated process, suggested to the user based on what is contained in the user profile data 28, etc.

Knowledge databases 36 thus provide standardized or statistically relevant data that can be used by the analysis engine 22 to predict or suggest future calendar entries for the user. For example, if the user has a dog, a dog knowledge database may be selected that dictates how often the dog should receive flea and tick treatments. If the user has young children, a family knowledge database may be utilized to determine school schedules. If the user travels often, an airline knowledge database may be utilized to recognize commonly delayed flight routes, etc. The knowledge databases 36 may also comprise mapping data such as Google Maps™ (which is a common law trademark of Google, Inc.) that can provide location, route and drive time information. An automobile knowledge database may be employed that determines maintenance schedules for the user's car. A weather knowledge database may be employed to predict weather and road conditions. It is understood that any number and type of external knowledge databases 36 could be employed.

Figure 2:
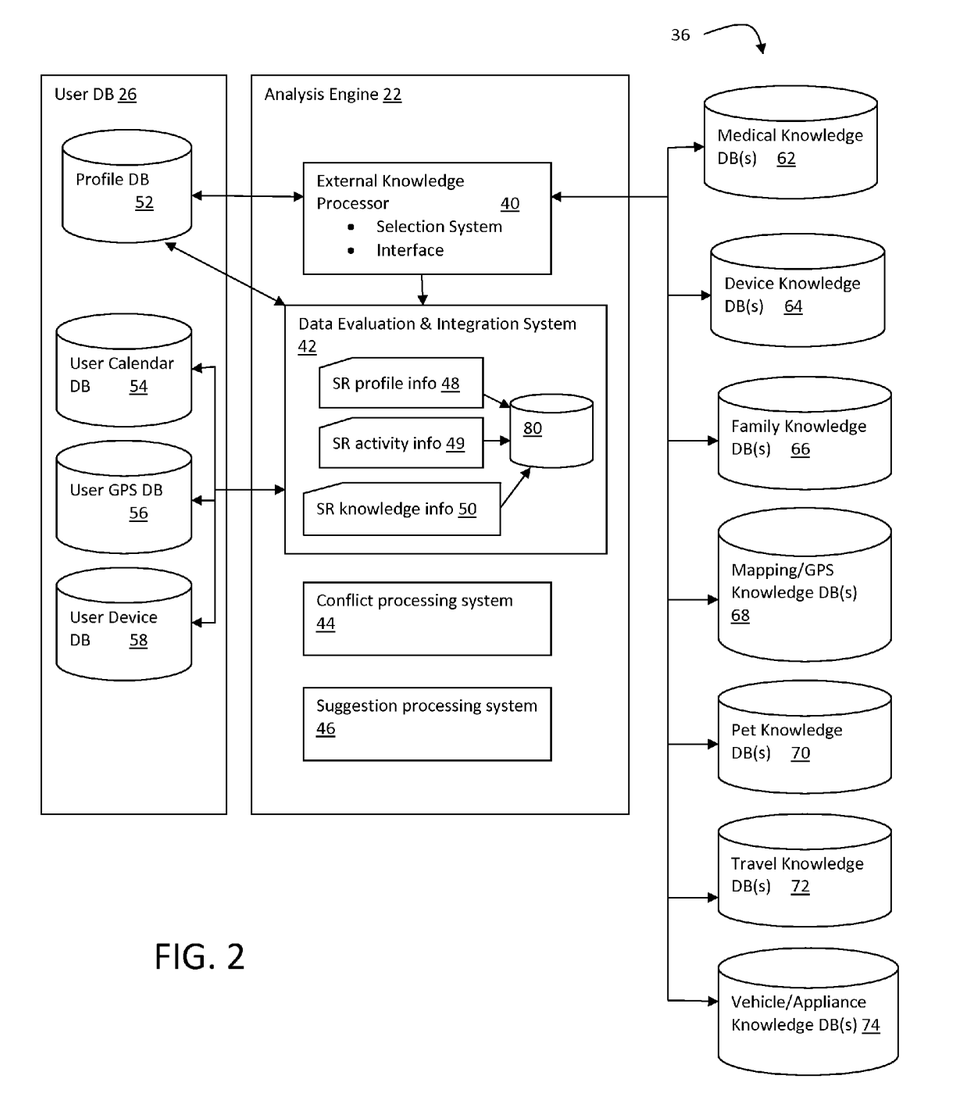
FIG. 2 depicts an analysis engine for the smart calendar system of FIG. 1 in accordance with embodiments of the present invention.

FIG. 2 depicts a more detailed view of an illustrative analysis engine 22. As shown, analysis engine 22 includes an external knowledge processor 40 that includes, e.g., a selection system for selecting external knowledge databases 36 and an interface for filtering and extracting relevant knowledge data from the external knowledge databases 36. As noted, the selection system can be driven primarily by what is entered in the user profile database 52. Accordingly, for each class of data present in the profile data, one or more knowledge databases 36 can be selected. In this example, selected knowledge databases 36 include medical 62, device 64, family 66, mapping/GPS 68, pet 70, travel 72, and vehicle/appliance 74.

Data evaluation and integration system 42 evaluates data from the three sources (i.e., profile data database 52, databases 54, 56, 58 and knowledge databases 36) to identify schedule-related (SR) profile information 48, SR activity information 49 and SR knowledge information 50 for one or more classes of schedulable items. SR information 48, 49, 50 may comprise any data, pattern, trend, agenda, behavior, calendar entry, schedule, logic, occurrence, etc., that has some bearing on scheduling activities relevant to (i.e., associated with) the user and the user's schedule. For example, SR profile information 48 may include the fact the user's child requires twenty-four hours of recovery from a doctor's appointment. SR activity information 49 may include calendar items entered by the user; travel or GPS patterns regarding where the user tends to be located at particular times; or automobile maintenance history. SR knowledge information 50 may include, e.g., recommended medical tests for a person with a known condition, maintenance schedules for the user's vehicle, predicted times to travel between known points, etc.

Once identified, the SR information 48, 49, 50 is integrated into a predefined schema, ontology or format, and ultimately provides a collection of integrated scheduling information 80. The integration of SR information 48, 49, 50, may comprise transforming disparate data types into a common format and then creating a data structure of prospective scheduling entries along with dates or date ranges. The prospective scheduling entries may also be tagged with different types of metadata based on various criteria such as its importance, flexibility, conflict criteria, etc. For instance a doctor's appointment for a child may be deemed highly important, not flexible for rescheduling, and subject to two hours of conflict following the appointment for selected activities. A hair dresser appointment may be deemed important, but moderately flexible for rescheduling. A proposed car servicing may be deemed low importance and highly flexible.

Illustrative entries of integrated scheduling information 80 may be as follows:

| Source | Event | Time: Date | Metadata | Location |
|---|---|---|---|---|
| Calendar | Hair Appt | 10/10: 2 PM | Medium | A street |
| Car DB | Car Appt Due | 10/1-10/14 | Flexible | tbd |
| GPS | Kid Soccer | 10/6: 1-4 PM | Physical | B street |
| Calendar | Kid Doctor Appt | 10/5: 10 AM | Important | C street |
| Profile | Kid Recovery period | 10/5-10/6 | No activity | Home |
| Calendar | Nail Appt | 10/9: 4 PM | Medium | A street |
| GPS | Predicted Route | 10/10 1:30 PM | <Map datalink> | |

As shown, scheduling entries may, e.g., include a data source of where the entry came from, an event, a time/date range associated with the event, metadata regarding the event, and a location. In addition, travel route predictions can be included based on historical GPS data, which in this case comprises a link to some external map data.

Once the integration from all the three data sources is completed, analysis engine 22: (1) identifies potential conflicts using conflict processing system 44; and/or (2) creates suggested modifications or changes to the calendar using suggestion processing system 46. Conflicts may simply indicate that there are potentially multiple calendar items that occur at the same time. For example, it can be seen that the kid recovery period entry may conflict with the kid soccer entry. Accordingly, an alert can be issued to the user to consider rescheduling.

Suggestions may be generated as a result of a potential conflict and/or based upon improved efficiencies. For example, it can be seen that the hair and nail appointments are on the same street, but occur on back to back days. Suggestion processing system 46 may recommend rescheduling one of the appointments so the two appointments are contiguous. Further, suggestion processing system 46 may recommend a car appointment be scheduled on a day with no other activities within the specified date range.

Further examples are as follows. Martha is a mother of two and has a new baby boy Mark, three months of age. Martha has previously entered profile data in the smart calendar. It includes the immunization calendar for her son, and she makes this type of event priority over other events. In addition she has indicated that Mark usually requires twenty-four hours of recovery following immunization. Martha had a previous engagement that was recorded on her calendar for an annual family portrait for this upcoming weekend. This portrait session occurs the day following Mark's scheduled immunization on the Friday before. As a result of this scheduled event, the smart calendar predicts this upcoming conflict and prompts Martha with a request to consider rescheduling the portrait session. Martha contacts the portrait studio to request the reschedule and the new scheduled portrait session is a success with all her children in a good mood.

In another example, Frank has purchased a used 2004 Honda Civic. Upon the purchase of his vehicle he updates his smart calendar system by selecting a pre-populated knowledge database specific to his vehicle type that includes a variety of maintenance activities that should occur for this particular model of car. He also includes the present mileage of his vehicle and any known repairs that have been performed on the car, and the current state of the vehicle based on his knowledge. In addition he adds his mechanic's contact information.

Within two months of owning the vehicle, the smart calendar identifies that this particular vehicle type requires a tune up within one year of purchase and therefore automatically populates a new calendar event on Frank's calendar to perform this tune up. When this event time arrives Frank sees the calendar reminder and the number for his mechanic.

In still a further example, Dave and Julie are parents to a family of three children. They have two children in elementary school and one who is about to attend high school. Dave and Julie completed and updated their user profile when each child was very young. This included selecting a knowledge database that provides suggested items children will require throughout their schooling careers. August arrives and Dave is prompted with a reminder on his calendar that their son who is attending high school in September will likely require a calculator, portable computer, and lock for a locker. Dave takes his son to the store to purchase the required items and he is now ready for the first day.

In still a further example, Joanne is very meticulous in keeping up her appearance. She visits both the Salon and manicurist on a regular basis. Joanne begins using the smart calendar system to post her various appointments. When Joanne enters her user profile she includes importing data from her GPS as well as her favorite salon and manicure locations and contact information.

Her personal calendar is generated by the system. Based on her profile settings, Joanne requests to receive reminders of her upcoming appointments one week in advance in addition to any smart calendar suggestions. One week prior to her hair appointment Joanne receives this reminder and a recommendation indicating to her that her manicurist is on route to her hairstylist and she has an open hour prior to her hair appointment. Joanne agrees and contacts her manicurist to reschedule the appointment and the calendar automatically moves her nail appointment to the new date where Joanne then enters the exact time.

In a further embodiment, the smart calendar system may include a 'where' or 'location' button for each event. By clicking the button the user is able to select the event's location from a map, such as for example a hair salon, manicurist or doctor. The smart calendar system then views all current and future appointments to determine if they should be rescheduled in a sequential order in order to save time/fuel.

Users are also able to select the type of travel method used for example, car, bike or foot. This allows the smart calendar to determine, based on the type of travel, whether the next destination is reachable in time based on the type of chosen method of travel by the user.

The system for example may identify that within a one month time there are three appointments occurring on separately scheduled days that have a fairly close proximately to one another. The system therefore sends a notification to the user indicating a suggested change to align the appointments together in a single day thereby increasing their efficiency and reducing the wear and tear on the vehicle and reduce fuel consumption.

As noted, the smart calendar system may also pull GPS data from the user's vehicle in real time or as required to identify if a reschedule of an appointment should occur based on the user's current location. For example, the user may decide to have an unscheduled restaurant dinner which is in close proximity to their dry cleaner and the user has an appointment the next day to pick up their dry cleaning from this location. The smart calendar system may send the user a message indicating this suggested change to the event.

Accordingly, the user's smart calendar may continuously pull data from the various appointment addresses and GPS data to continuously compare the routes. By doing so it examines the 'shortest path' between the various addresses and compares this against the calendar entries.

An illustrative process for handling this is as follows:
1. Input data is obtained from the user's GPS system (installed in a vehicle, phone or laptop) and a reading is constantly taken from the user's current vehicle location from the GPS device and converted into city data.
2. This data is then collected in a data collection system.
3. Data integration is performed and this data is analyzed for proximity (it calculates the distance between the two locations) and compares against the scheduled events in the user's calendar with their associated location information inputted earlier by the user.
4. The analysis engine 22 then determines based on a comparison of the various GPS destination points against the event locations documented on the users calendar to determine which destinations could be grouped together based on their proximately.
5. The system identifies suggested reroutes and event changes and communicates these suggested calendar changes in time for the user to make any change to their destination/schedule.

Figure 3:
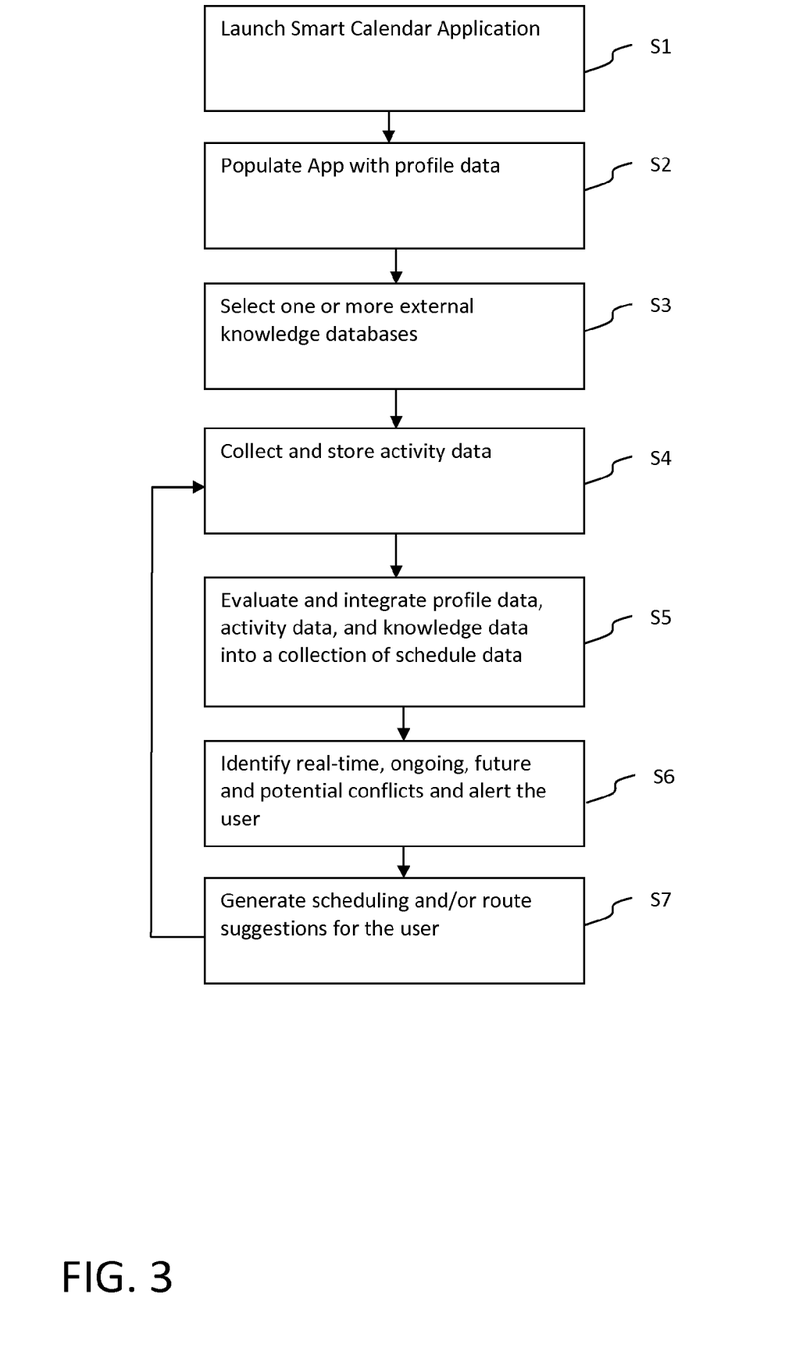
FIG. 3 depicts a flow diagram showing a method for implementing a smart calendar in accordance with embodiments of the present invention.

FIG. 3 depicts a flow diagram showing a process of implementing the smart calendar system 18. First, at S1, a user launches the smart calendar application, and then populates the application with profile data at S2. Next, at S3, one or more external knowledge databases are selected. At S4, activity data (e.g., calendar entries, GPS information, device data, etc.) is collected and stored. Next, profile data, activity data, and knowledge data are evaluated and integrated to form a collection of schedule data at S5. At S6, real-time, ongoing, future and potential conflicts are identified and the user is alerted and at S7 scheduling and/or route suggestions are generated for the user. S4-S7 continuously loops thereafter to provide ongoing smart calendaring for the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer readable medium(s) having computer readable program code embodied thereon.

Any combination of one or more computer readable medium(s) may be utilized. The computer readable medium comprises a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Alternatively, the program product could be embodied on computer readable signal medium which may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer system 10 of FIG. 1 may comprise any type of computing device and is shown including a one or more processors 14, memory 12, an input/output (I/O) 16 (e.g., one or more I/O interfaces and/or devices), and a communications pathway 17. In general, processor(s) 14 execute program code, such as smart calendar system 18, which is at least partially fixed in memory 12. While executing program code, processor(s) 14 can process data, which can result in reading and/or writing transformed data from/to memory 12 and/or I/O 16 for further processing. Pathway 17 provides a communications link between each of the components in computer system 10. I/O 16 can comprise one or more human I/O devices, which enable a user to interact with computer system 10. To this extent, smart calendar system 18 can manage a set of interfaces (e.g., graphical user interface(s), application program interface, and/or the like) that enable human and/or system users to interact with the smart calendar system 18. Further, smart calendar system 18 can manage (e.g., store, retrieve, create, manipulate, organize, present, etc.) data, such as data in user database 26, using any solution.

In any event, computer system 10 can comprise one or more general purpose computing articles of manufacture (e.g., computing devices) capable of executing program code. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, smart calendar system 18 can be embodied as any combination of system software and/or application software.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system having a smart calendar system for managing schedule items, comprising:
   a one or more processors;
   a database for storing activity data associated with a user, wherein the activity data includes items scheduled for the user;
   an interface for receiving and storing profile data associated with the user, wherein the profile data includes metadata associated with potentially scheduled items;
   an analysis engine that includes:
   a system for selecting and interfacing with a plurality of external knowledge databases to obtain knowledge data associated with the user;
   a system that integrates the profile data, activity data, and knowledge data into a collection of integrated scheduling information;
   a suggestion system that suggests modifications to the items scheduled for the user, based on the integrated scheduling information; and
   a conflict system that identifies potential conflicts in the items scheduled for the user, based on the integrated scheduling information,
   wherein the activity data further includes global positioning system (GPS) data providing location and route information of the user,
   wherein the GPS data is utilized by the analysis engine to predict future location and route information,
   wherein the location and route information predicted is utilized by the suggestion system to suggest rescheduling an item to improve travel efficiency for the user.

2. The computer system of claim 1, wherein the location and route information predicted is utilized by the conflict system to identify a conflict with a scheduled event based on a travel time required by the user.

3. The computer system of claim 1, wherein the activity data further includes device data collected from a device associated with the user.

4. The computer system of claim 1, wherein the plurality of external knowledge databases include at least one of medical, device, family, mapping, pet, vehicle, and travel knowledge.

5. A program product stored on a non-transitory computer readable storage medium, which when executed by a computer system, provides a smart calendar system for managing schedule items, and comprises:

program code for storing activity data associated with a user, wherein the activity data includes items scheduled for the user;
 program code for receiving and storing profile data associated with the user, wherein the profile data includes metadata associated with potentially scheduled items;
 program code for selecting and interfacing with a plurality of external knowledge databases to obtain knowledge data associated with the user;
 program code that integrates the profile data, activity data, and knowledge data into a collection of integrated scheduling information;
 program code that suggests modifications to the items scheduled for the user, based on the integrated scheduling information; and
 program code that identifies potential conflicts in the items scheduled for the user, based on the integrated scheduling information,
 wherein the activity data further includes global positioning system (GPS) data providing location and route information of the user,
 wherein the GPS data is utilized to predict future location and route information,
 wherein the location and route information predicted is utilized to suggest rescheduling an item to improve travel efficiency for the user.

6. The program product of claim 5, wherein the location and route information predicted is utilized to identify a conflict with a scheduled event based on a travel time required by the user.

7. The program product of claim 5, wherein the activity data further includes device data collected from a device associated with the user.

8. The program product of claim 5, wherein the plurality of external knowledge databases include at least one of medical, device, family, mapping, pet, vehicle, and travel knowledge.

9. A computerized method for managing schedule items in an electronic calendar system, comprising:

storing activity data associated with a user, wherein the activity data includes items scheduled for the user;
 receiving and storing profile data associated with the user, wherein the profile data includes metadata associated with potentially scheduled items;
 selecting and interfacing with a plurality of external knowledge databases to obtain knowledge data associated with the user;
 integrating the profile data, activity data, and knowledge data into a collection of integrated scheduling information; and
 outputting at least one of a suggested modification to at least one of the items scheduled for the user and to a potential conflict in the items scheduled for the user, based on the integrated scheduling information,
 wherein the activity data further includes global positioning system (GPS) data providing location and route information of the user,
 wherein the GPS data is utilized to predict future location and route information,
 wherein the location and route information predicted is utilized to suggest rescheduling an item to improve travel efficiency for the user.

10. The method of claim 9, wherein the location and route information predicted is utilized to identify a conflict with a scheduled event based on a travel time required by the user.

11. The method of claim 9, wherein the plurality of external knowledge databases include at least one of medical, device, family, mapping, pet, vehicle, and travel knowledge.

* * * * *